June 21, 1955          L. S. GATY          2,711,217
                    AUTOMATIC FEED BOX
Filed April 26, 1954.                    2 Sheets-Sheet 1
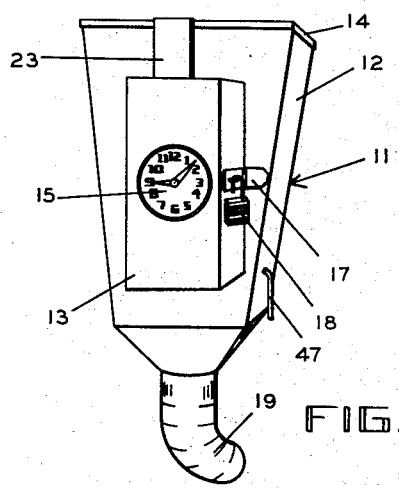
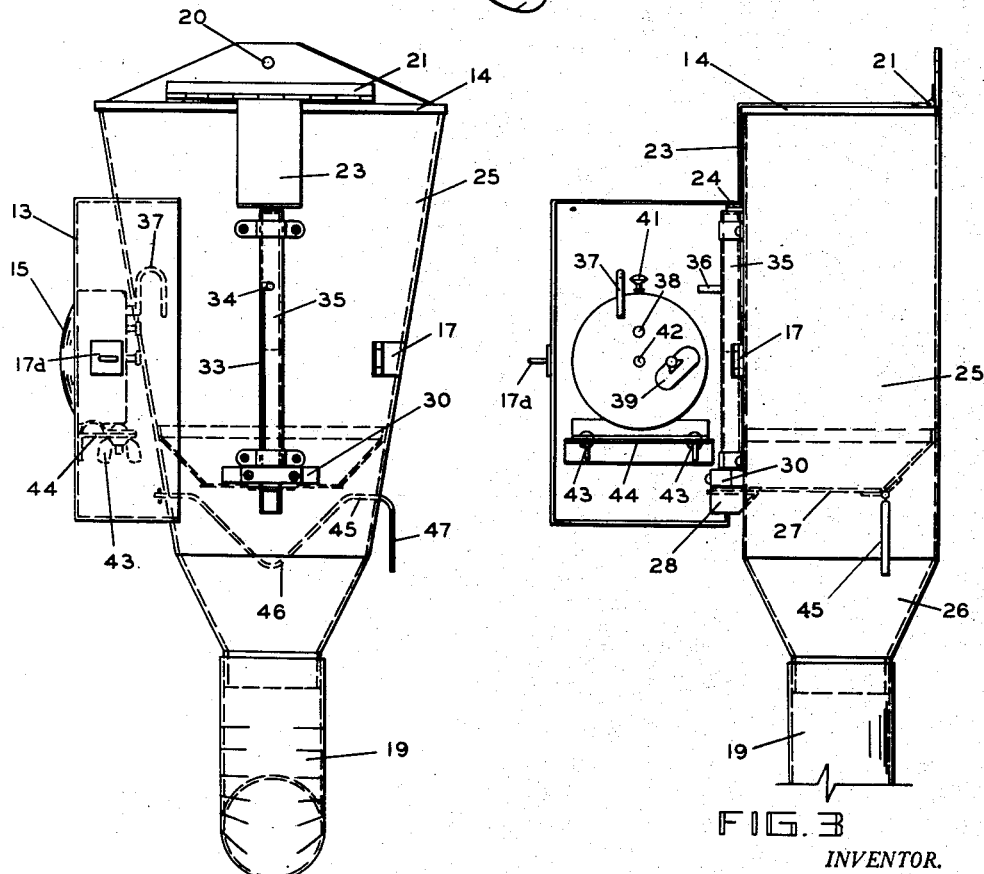
INVENTOR.
LEE S. GATY
BY
Jerome R. Cox
ATTORNEY June 21, 1955  L. S. GATY  2,711,217
AUTOMATIC FEED BOX
Filed April 26, 1954  2 Sheets-Sheet 2

INVENTOR.
LEE S. GATY
BY
Jerome R. Cox
ATTORNEY

United States Patent Office 2,711,217
Patented June 21, 1955

2,711,217

AUTOMATIC FEED BOX

Lee S. Gaty, Columbus, Ohio

Application April 26, 1954, Serial No. 425,487

3 Claims. (Cl. 161—10)

This invention disclosed and claimed in this application relates to improvements in machines for feeding animals at regular predetermined times. It is illustrated as a feed box for horses.

It is usual in the care of race horses and other animals to feed them at an early hour so that their food can be digested to a degree that will not hurt them when they are given a workout on the track, or when they are used in other working.

Usually such feeding is done manually by the owner, or by the trainer or by another employee. This, because of human weaknesses, is sometimes at irregular times and sometimes the horse has his workout too soon after his feeding. Devices have been devised heretofore for feeding live stock including poultry and some of such devices have even been designated for the feeding of horses. However, none of these have gone into widespread use, probably largely because such devices are not positive and definite in their action, or are not as reliable in their action as is necessary. In such prior devices, it has also been suggested that a clock device be provided to release the feed. In such cases the release has depended directly on the clock mechanism and as suggested above is not as positive as is desirable and furthermore the resetting of the release is more difficult than desirable.

One of the objects of my invention therefore is the provision of a machine for feeding animals which is quick and positive in release at a definite time, is relatively quiet, is easily reset, is reliable in operation and cannot be tampered with.

A further object of my invention is the provision of such a machine which enables the owner to be assured that the animal will be fed at a regular time rather than relying upon the vagaries and habits of any person.

A further object of my invention is the provision of a machine especially adapted for the feeding of race horses at a definite time in the morning so that they can follow a regular schedule of feeding, rest and exercise.

A further object is the provision of a machine which saves time and labor for the owner and for the trainer.

Further objects and features of my invention will be apparent from the subjoined specification and claims when considered in connection with the accompanying drawings, illustrating one embodiment of my invention:

In the drawings:

Fig. 1 is a view in perspective of a machine illustrating an embodiment of my invention;

Fig. 2 is a view in front elevation of the machine shown in Fig. 1 shown on a larger scale, showing the auxiliary clock casing open, and showing some of the hidden parts in dotted lines;

Fig. 3 is a fragmentary view in side elevation of the machine in the condition illustrated in Fig. 2;

Figure 4:
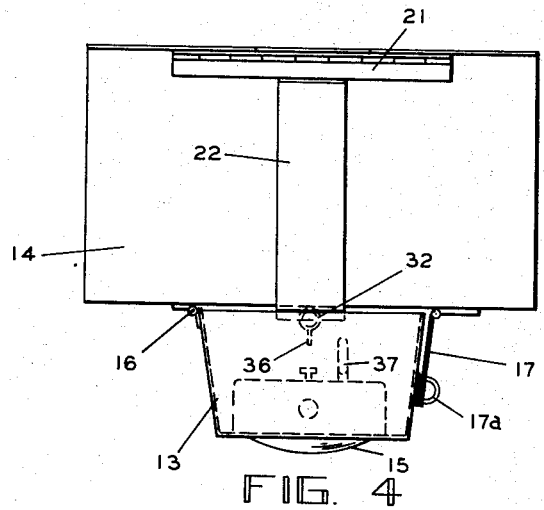
Fig. 4 is a view in top plan having some of the interior portions shown in dotted lines.

Referring in detail to the drawings, it may be seen that I have shown in Fig. 1 a feed box for horses generally designated 11, and consisting of a box-like structure 12 having a clock casing 13 and a top cover 14. The clock casing 13 carries a clock 15 of the familiar alarm clock style but which has the alarm bell removed, the casing being hinged at 16 to the structure 12. Normally this clock casing 13 is held in the closed position by the hinge 16 and by a hasp 17 and staple 17a. A padlock 18 may be provided for the hasp 17 and the staple 17a, if desired. The lower end of the box tapers in funnel fashion and is connected to a spout or elbow 19 by which the feed is directed into the feed bucket for the horse. An upward extension of the rear side of the box-like structure 12 is provided with a hole 20 by which the machine may be hung at any convenient location for delivery of feed to the feeding bucket. The top cover 14 is pivoted on a hinge 21 and includes a strap 22 which is bent at a right angle and extends downwardly as at 23. The lower end of the downward extension 23 of the strap 22 is formed with a horizontal lip 24 which extends under the clock casing 13 and thus secures the top cover 14.

The box-like structure 12 comprises a tapered bin 25 and a tapered portion 26 below the bin which leads to the spout or elbow 19. The locking of the cover (by means of the reinforcing strap 22, the downward extension 23 and the lip 24) prevents unauthorized persons from gaining access to the bin 25.

The box-like structure 12 thus has the bin 25 for holding feed. At the lower end of the bin I have provided a horizontal hinged door or gate 27 which is shown most clearly in Figs. 3 and 5. This door or gate 27 is at times held in closed position by a latch 28. The latch must be of a type which provides positive and definite action in releasing the feed. Such positive release is accomplished by the plunger arrangement, which I use in combination with a latch of the type shown in U. S. Patent No. 2,233,278. The latch 28 has a projection 29 which fits under the door or gate 27 and, assuming the door or gate is in the position shown in Fig. 3 or 5, normally holds the door or gate closed and keeps the feed in the bin. The latch 28 also has a vertical projection 31 which when pushed downward compresses a spring and moves the lateral projection 29 away from the door 27 thus allowing the door to fall and its contents also to fall into the feed bucket. The spring of the latch normally holds the projection 29 out in gate supporting position. The projection 29 is moved to its inner position by a pivoted member which is in turn actuated by movement of the vertical member 31. The arrangement is such that when the releasing action is once started, the latch tends to move quickly to its retracted or fully released position.

I provide means by which the latch 28 may be operated positively to release the door and release the feed. Secured on the front side of the box structure 12 is a hollow tube 32 formed with a vertical slot 33. The slot 33 (adjacent to the upper end) is formed with a horizontal notch 34. A plunger 35 which is of appreciable weight is positioned in the hollow tube and is mounted for vertical sliding movement therein. Preferably this plunger is solid. It is positioned to strike the vertical projection 31 when it falls and thus to release the latch 28. The plunger 35 is provided with a pin 36 which may be positioned in its uppermost position in the notch 34. I remove not only the alarm bell of the clock but also I remove the winding key for the alarm of the clock 15 and replace it with a curved lever 37 which is so arranged that it may move less than one complete revolution, being stopped in either direction by contact with the alarm set wheel 38. In its revolution from contact on one side of the alarm set wheel 38 to contact on the opposite side thereof just after it reaches its uppermost position, the curved lever 37 strikes the pin 36 if it is in the notch 34 and moves it out of the notch so that the plunger 35 may fall, the pin moving downward in the slot 33. The fact that the lever 37 is moving downward when it strikes the pin 36 prevents any possibility of jamming the pin and holding the plunger in its upper position.

The clock is provided with a time wind 39, with an alarm turn-off 41, and with a clock set wheel 42. It is secured by wing nuts 43 to a shelf 44.

The door 27 is a closure for the bottom of the bin 25.

I provide means for raising the door or closure 27 to its closed position. This means comprises a wire 45 pivoted in two of the sides of the box-like structure 12. The wire 45 has an offset portion 46 for moving the door to its feed holding position and has a handle portion 47 extending out of the box-like structure whereby the wire may be operated.

Figure 5:
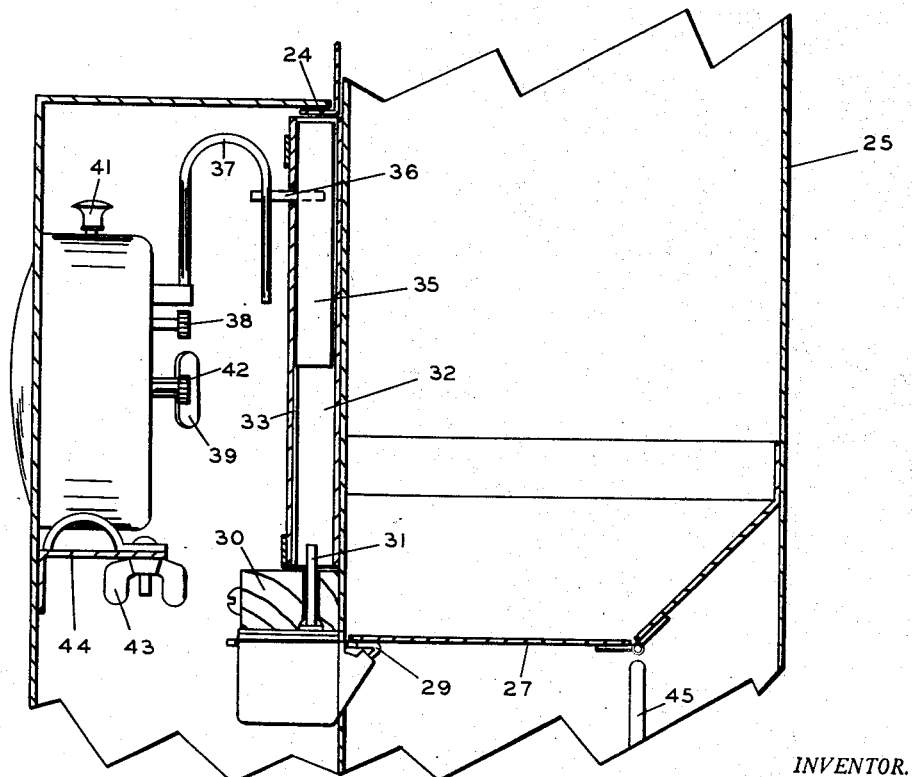
Fig. 5 is a fragmentary view in side elevation of a portion of Fig. 2, but shown on a much larger scale.

In the operation of the above described embodiment of my invention, much time and labor is saved for the horse owner or trainer and the owner is sure that the horse is fed regularly with a result that the condition of the horse is much improved. In the evening the owner or trainer winds the time wind 39 so that the clock can be operated, sets the clock by the clock set wheel 42, sets the alarm by means of the set wheel 38 at the hour at which it is desired to feed the horse, turns the curved lever 37 in a counterclockwise direction, raises the alarm turn-off 41 so as to make the alarm portion of the clock operative, raises the plunger 35 putting the pin 36 in the notch 34 and by means of the wire 45 raises the door 27 to its latched position as shown in Figs. 3 and 5. He then puts into the box the required amount of oats, grain or any other dry food he wants for the horse, closes the cover 14 and then closes the clock casing 13 and locks it by means of the padlock 18, thus locking also the cover. In the morning at the appointed time, the alarm clock trips the lever 37 which in turn pushes the pin 36 from its notch and allows the plunger 35 to drop, striking the vertical extension 31 and releasing the latch 28 with a result that the door 27 drops around its hinge and the feed moves into the feed bucket. The horse is thus fed at a regular time and quietly eats its breakfast without any confusion or disturbance. The owner sleeps for an hour or two longer with the satisfaction of knowing that his horses are fed at the proper time and are not being neglected. When the owner arrives at the barn the horses are all ready to be taken to the track with their food all digested to a degree that it will not hurt to exercise them in a workout. The feed box is designed to hang on the wall outside of a stall with the spout going through the wall to the feed bucket. However, if the front wall of the stall is of such material that it makes it difficult to form a hole, then the box can be put on the inside of the stall directly over the feed bucket. The horse will not nibble on the box as it is all metal. Even if he does, he cannot harm it as the trigger latch and timing device are enclosed and locked. When the timing device goes off, there is practically no noise, other than that of the plunger falling and the feed falling into the bucket.

In setting the machine for operation (if it seems more convenient) the bottom door may be shut by means of the wire 45 and the feed may be placed inside the feed bin prior to raising the plunger into the notch inasmuch as the weight of the plunger will not of itself trip the latch, notwithstanding the fact that the force of the falling plunger will trip it every time without fail in a positive manner. This of course is due to the fact that the raising of the plunger creates potential energy which is converted into kinetic energy as the plunger falls and as a result of the impact as the plunger strikes the projection 31 the plunger exerts a force many times the weight of the plunger.

It is to be understood that the above described embodiments of my invention are for the purpose of illustration only and various changes may be made therein without departing from the spirit and scope of the invention.

I claim:

1. A machine for feeding animals comprising a box-like structure having sides and having a bin for holding feed, a cover for said bin, a closure for closing at times the lower end of said bin, a releasable latch for said closure, a clock mechanism for releasing said latch, a hinged clock casing movable to and from a closed and an open position and covering said clock mechanism when in closed position, an extension on said bin cover having a lip which is secured under said clock casing when the clock casing is in closed position, and means for locking said clock casing in closed position to lock also said cover in closed position.

2. The structure defined in claim 1 in which there is provided a means operable by said clock mechanism for releasing said latch comprising a vertical tube secured to said bin and formed with a substantially vertical slot and with a horizontal notch adjacent to the top of said vertical slot, a plunger mounted for vertical sliding movement in said tube and releasing said latch when moving downward, a horizontal pin secured to said plunger and positioned to extend either through said slot or said notch, and means controlled by said clock mechanism for moving said pin from said notch to cause the plunger to fall downward under the influence of gravity to release said latch.

3. The structure defined in claim 1 in which there is provided a means controlled by the clock mechanism for releasing the latch comprising a plunger mounted for vertical sliding movement and positioned to release said latch when moving downward, a guide member formed with a horizontal notch and secured to said bin, a pin secured to said plunger at times positioned in said notch, and means controlled by the clock mechanism including a pivoted lever movable through an arc of less than 360° for moving said pin out of said notch to cause the plunger to fall downward under the influence of gravity to release said latch.

References Cited in the file of this patent

UNITED STATES PATENTS

| Number | Name | Date |
|---|---|---|
| 317,708 | Bissell | May 12, 1885 |
| 727,058 | Baker | May 5, 1903 |
| 786,437 | Hanson | Apr. 4, 1905 |
| 834,305 | Kazora | Oct. 30, 1906 |
| 936,294 | Boggess | Oct. 12, 1909 |
| 1,004,827 | Tonsor | Oct. 3, 1911 |
| 1,006,487 | Landis | Oct. 24, 1911 |
| 1,049,343 | Currie | Jan. 7, 1913 |
| 1,167,231 | Tizley | Jan. 4, 1916 |
| 1,317,172 | Mailloux | Sept. 30, 1919 |
| 1,435,638 | Granger | Nov. 14, 1922 |
| 2,221,594 | Lockwood | Nov. 12, 1940 |
| 2,272,303 | Kriegbaum et al. | Feb. 10, 1942 |
| 2,286,427 | Levenstein | June 16, 1942 |
| 2,392,445 | Anderson | Jan. 8, 1946 |
| 2,447,787 | Atkinson | Aug. 24, 1948 |